(12) United States Patent
Nakajima

(10) Patent No.: US 6,409,278 B1
(45) Date of Patent: Jun. 25, 2002

(54) SPOKE NIPPLE FOR BICYCLE WHEEL

(75) Inventor: Masao Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/495,941

(22) Filed: Feb. 2, 2000

(51) Int. Cl.[7] .............................................. B60B 27/00
(52) U.S. Cl. ...................................... 301/59; 301/110.5
(58) Field of Search ............................. 301/55, 58, 59, 301/110.5, 104, 61

(56) References Cited

U.S. PATENT DOCUMENTS

| | | | |
|---|---|---|---|
| 2,937,905 A | | 5/1960 | Altenburger ................. 301/58 |
| 4,626,036 A | * | 12/1986 | Hinsberg et al. .............. 301/58 |
| 5,769,584 A | * | 6/1998 | Claes ......................... 411/427 |
| 5,810,453 A | * | 9/1998 | O'Brien ....................... 301/59 |
| 5,882,088 A | | 3/1999 | Yahata ...................... 301/110.5 |
| 6,010,197 A | | 1/2000 | Crosnier et al. ............. 301/59 |
| 6,126,243 A | * | 10/2000 | Okajima et al. .............. 301/58 |

FOREIGN PATENT DOCUMENTS

| | | | | |
|---|---|---|---|---|
| DE | 4306592 | | 9/1994 | |
| DE | 4415505 | | 2/1997 | |
| EP | 143394 | * | 6/1985 | ................. 301/58 |
| EP | 0764551 | | 3/1997 | |
| FR | 788516 | * | 10/1935 | ................. 301/59 |
| GB | 4449 | * | 3/1894 | ................. 301/55 |
| GB | 399963 | * | 10/1933 | ................. 301/58 |
| JP | 259501 | * | 12/1985 | ................. 301/55 |
| JP | 81801 | * | 4/1986 | ................. 301/58 |

* cited by examiner

*Primary Examiner*—Russell D. Stormer
(74) *Attorney, Agent, or Firm*—Shinjyu Global IP Counselors, LLP

(57) ABSTRACT

A bicycle wheel basically has a hub, a plurality of spoke nipples, a plurality of spokes extending outwardly from the hub and an annular rim coupled to the outer ends of the spokes for supporting a tire. The annular rim has a pair of spoke attachment portions with a plurality of openings for retaining outer ends of spokes therein. The outer ends of the spokes have bent sections located within the spoke holes of the rim and enlarged head members arranged to engage the spoke attachment portions. The hub has a pair of tubular mounting portions. Each tubular mounting portion has a plurality of mounting projections and a plurality of spoke attachment openings. The inner ends of the spokes are received in the spoke attachment openings from one side along with the spoke nipples from an opposite side. The inner ends of the spokes are threadedly coupled to the spoke nipples. Each of the spoke nipples has a head portion with a hexagonal bore and a shaft portion with an axial bore having internal threads. The head portion has a larger width than a maximum width of the shaft portion so that the head portion can engage a tubular mounting portion. The hexagonal bores in the spoke nipples make it possible to engage the hexagonal bores with a ball-hexagonal wrench at an angle to the spoke nipples in a limited space.

20 Claims, 7 Drawing Sheets

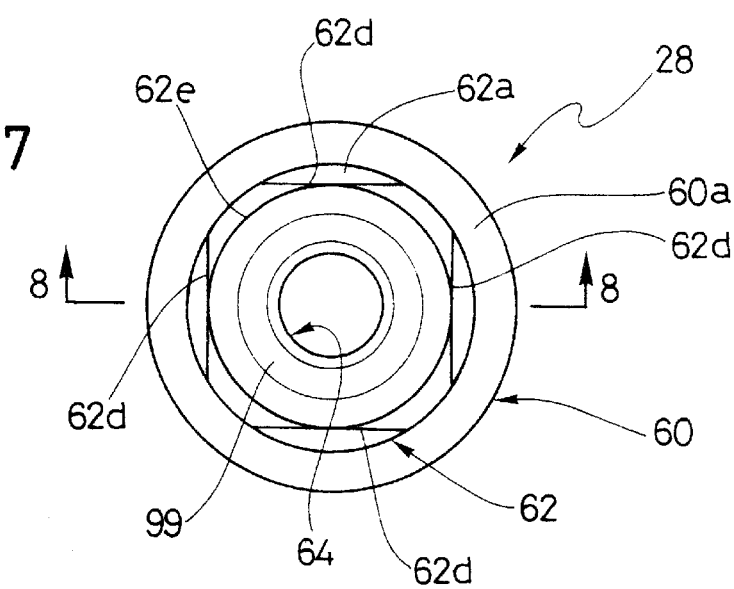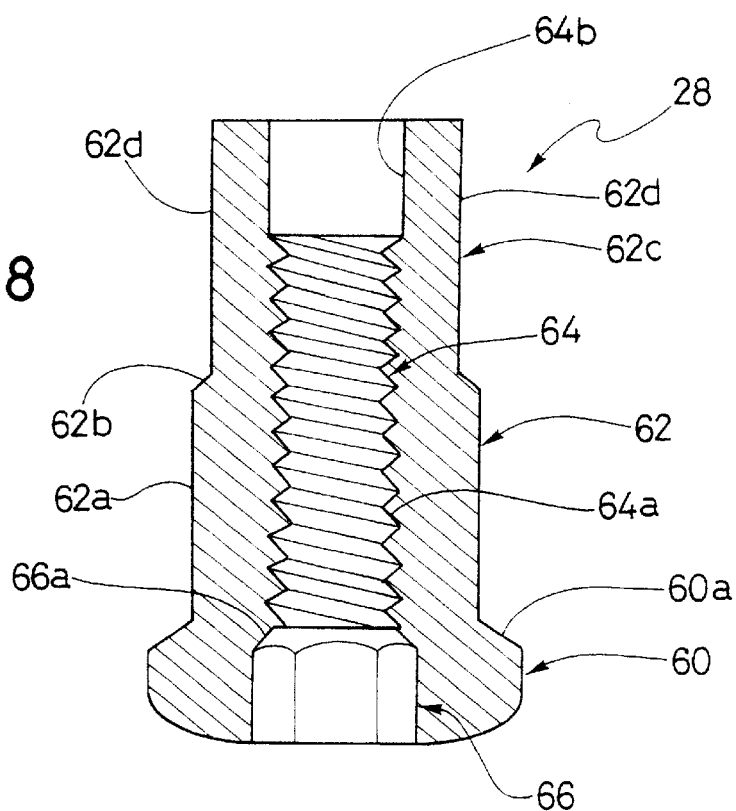

SPOKE NIPPLE FOR BICYCLE WHEEL

BACKGROUND OF THE INVENTION

1. Field of the Invention

This invention generally relates to spoke nipples for bicycle wheels. More specifically, the present invention relates to bicycle wheels in which spoke nipples are used to attach the spokes to the hub.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles that has been extensively redesigned over the past years is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub portion, a plurality of spokes and an annular rim. The hub is attached to a part of the frame of the bicycle for relative rotation. The spokes extend outwardly from the hub to the annular rim. The annular rim has a recess for supporting a pneumatic tire thereon. Typically, the spokes of the bicycle wheel were thin metal wire spokes. The ends of the hub are provided with a flange that is used to couple the spoke portions thereto. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples that secure the outer ends of the wire spokes to the rim. In particular, the spoke nipples have flanges, which engage the interior surface of the rim.

With a spoke constructed in this manner, the nipple is installed in a nipple hole formed in the rim, the spoke is inserted through the hole of the hub flange with the flange of the inner end of the spoke engaging the hole of the hub flange. The male threads on the outer ends of the spokes are threaded into the female threads of the spoke nipples installed in the openings of the rim. It is desirable in the bicycle industry to have as few spokes as possible. One problem with conventional spokes is the concentrated stress applied to the rim. Moreover, if fewer spokes are used, the stress on the rim becomes increasingly larger.

Recently, many new bicycle designs have been developed with increased strength, more aerodynamic designs or that are more lightweight. However, these prior art bicycle designs suffer many disadvantages. One major problem with these prior art designs is that most of these new designs are very expensive. Therefore, these expensive designs are limited to professional riders. Many of the newer bicycle wheels are unitary bicycle wheels. These unitary bicycle wheels have been designed to be are very durable. However, they can be very heavy. Moreover, many of these unitary designs are too rigid and do not provide a very comfortable ride. These unitary bicycle wheels are also typically very expensive. Accordingly, these prior art unitary bicycle wheels suffer from many disadvantages.

Recently, some bicycle wheel designs have reversed the spoke arrangement so that each of the spokes has an outer portion secured to the rim and a threaded end secured to the hub. The inner end can be secured to the hub via conventional spoke nipples. The conventional spoke nipples typically include a head portion and an internally threaded shaft portion. The head portion usually includes a groove so that the spoke nipple can be rotated using a conventional flathead screwdriver. However, in some designs, it can be difficult to access and/or rotate the spoke nipples using a conventional screwdriver. Therefore, a special tool may be required to rotate the spoke nipples. Such a tool is impractical for the recreational cyclist and inconvenient for mechanics. Accordingly, these prior art spoke nipples suffer from many disadvantages.

In view of the above, there exists a need for a bicycle wheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a spoke nipple for a bicycle wheel that makes the bicycle wheel relatively easy to assembly.

Another object of the present invention is to provide a spoke nipple for a bicycle wheel that does not require a special tool.

Still another object of the present invention is to provide a spoke nipple for a bicycle wheel that is versatile.

Still another object of the present invention is to provide a spoke nipple for a bicycle wheel, which is relatively inexpensive to manufacture.

The foregoing objects can be attained by providing a spoke nipple having a head portion and a shaft portion extending from the head portion. The head portion has an end surface with a hexagonal bore formed therein and a first predetermined width. The shaft portion has an axial bore with internal threads and a second maximum predetermined width that is smaller than the first predetermined width of the head portion.

In accordance with another aspect of the present invention, a spoked hub assembly is provided having a hub, a plurality of spoke nipples and a plurality of outwardly extending spokes. The hub has a plurality of spoke attachment openings. The spoke nipples arranged in the spoke attachment openings. Each spoke nipple has a head portion and a shaft portion extending from the head portion. The head portion has an end surface with a hexagonal bore formed therein and a first predetermined width. The shaft portion has an axial bore with internal threads and a second maximum predetermined width that is smaller than the first predetermined width of the head portion. Each of the outwardly extending spokes has an inner threaded end portion, an outer end portion, and a center portion located between the inner and outer end portions. Each of the inner threaded end portions are coupled to one of the spoke nipples and each of the outer end portions of the spokes has an enlarged head member adapted to be retained by a rim.

These and other objects, features, aspects and advantages of the present invention will become readily apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 7 is a top plan view of the spoke nipple illustrated in FIG. 5;

FIG. 8 is a longitudinal cross-sectional view of the spoke nipple illustrated in FIGS. 5–7 as seen along section line 8—8 of FIG. 7;

DETAILED DESCRIPTION OF THE PREFERRED EMBODIMENTS

Figure 1:
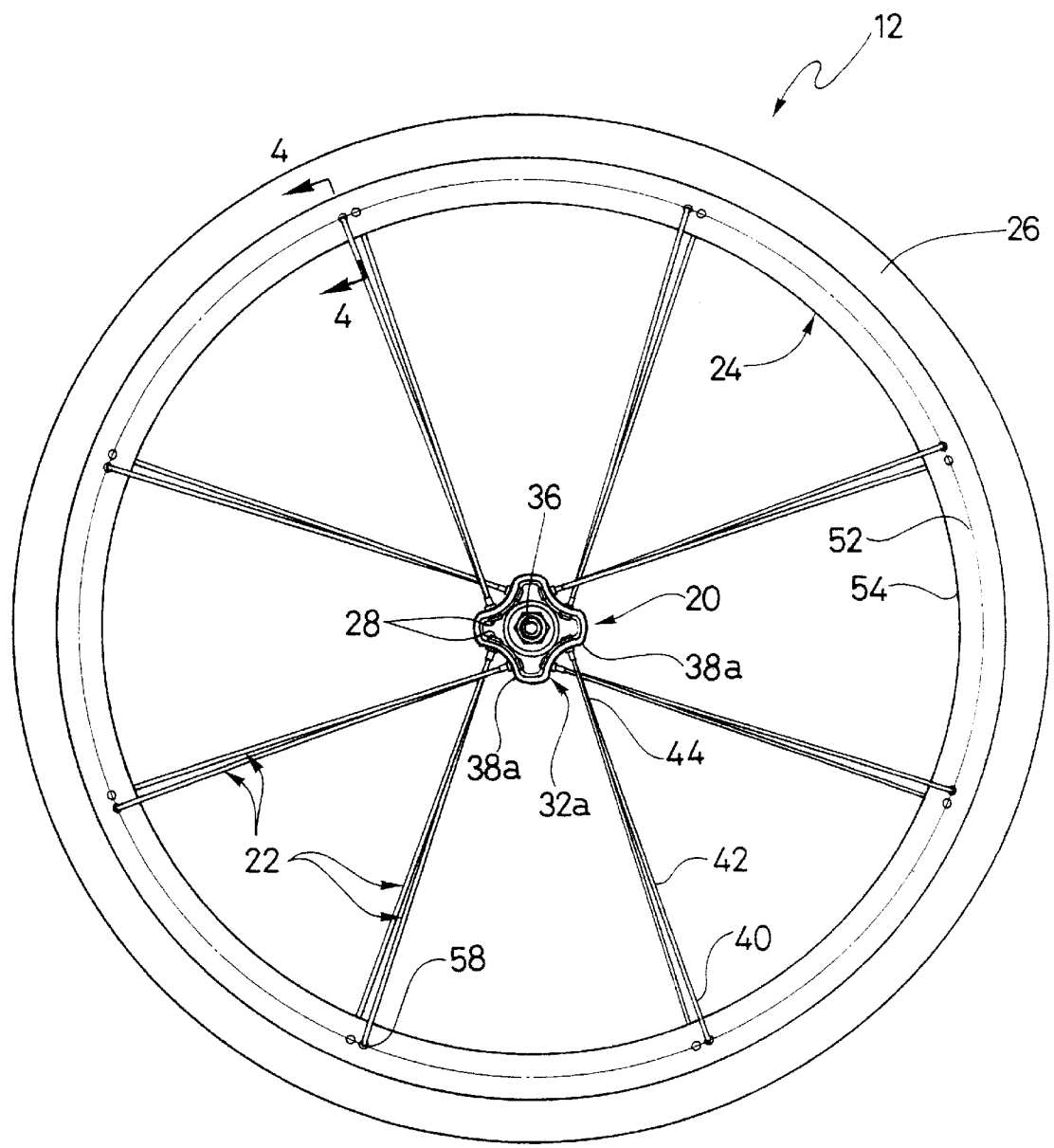
FIG. 1 is a left side elevational view of a bicycle wheel including a hub, a plurality of spoke nipples, a plurality of spokes and a rim in accordance with a first embodiment of the present invention.

Referring initially to FIG. 1, a bicycle wheel 12 is illustrated in accordance 4with the present invention. Bicycle wheel 12 can be utilized as either a front bicycle wheel or a rear bicycle wheel. Accordingly, it will be apparent to those skilled in the art from this disclosure that the description pertaining to the construction of bicycle wheel 12 applies to either a front bicycle wheel or a rear bicycle wheel.

Bicycle wheel 12 has a central hub 20, a plurality of outwardly extending spokes 22, a plurality of spoke nipples 28 and an annular rim 24 with a pneumatic tire 26 coupled thereto in a conventional manner. In the illustrated embodiment shown herein, bicycle wheel 12 has sixteen spokes 22 extending radially between central hub 20 and annular rim 24. Of course, it will be apparent to those skilled in the art from this disclosure that the bicycle wheel 12 can have fewer or more spokes 22 than illustrated if needed and/or desired.

Figure 2:
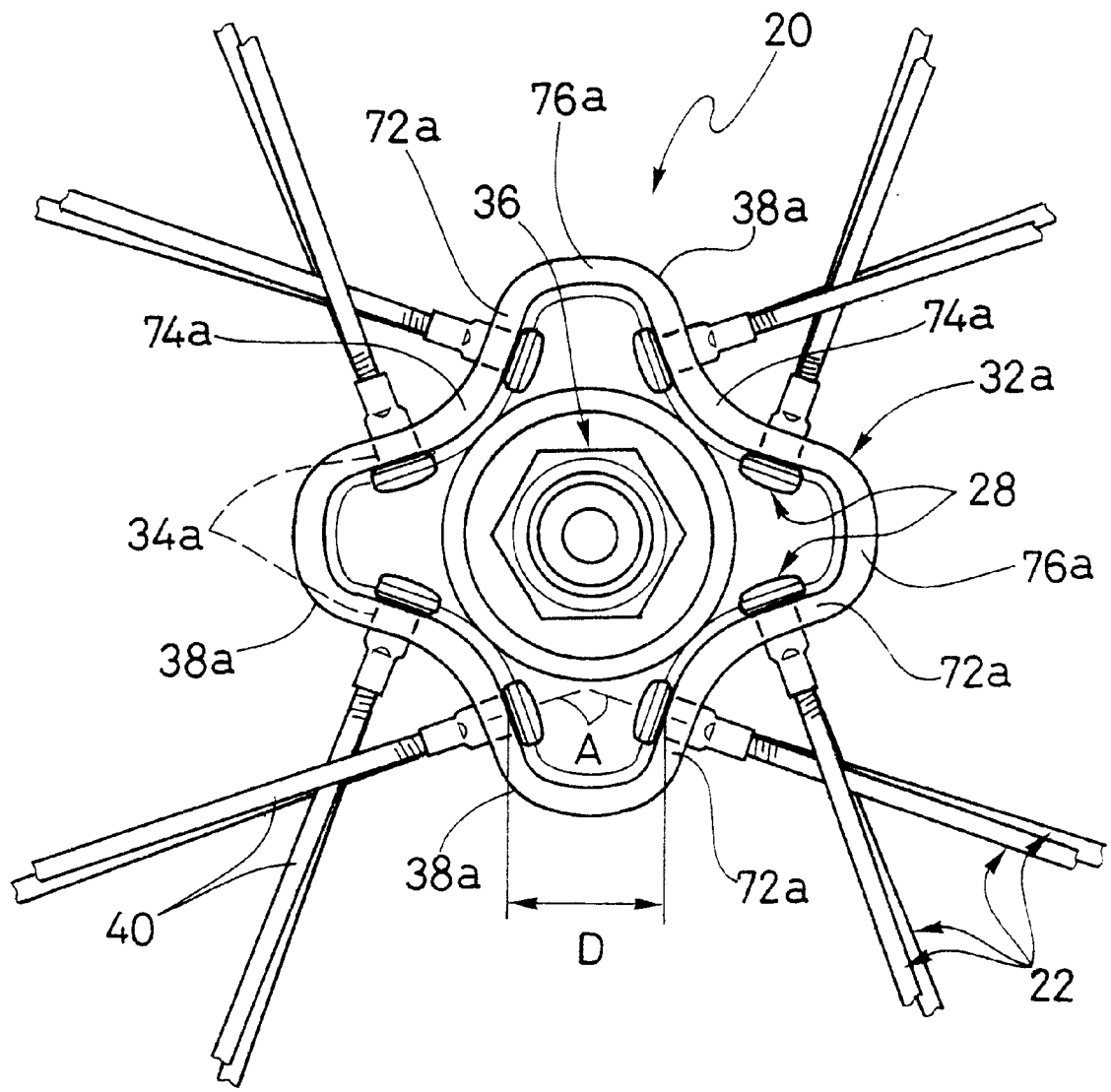
FIG. 2 is an enlarged, left side elevational view of the bicycle hub illustrated in FIG. 1 with the inner end portions of the spokes coupled thereto.
Figure 3:
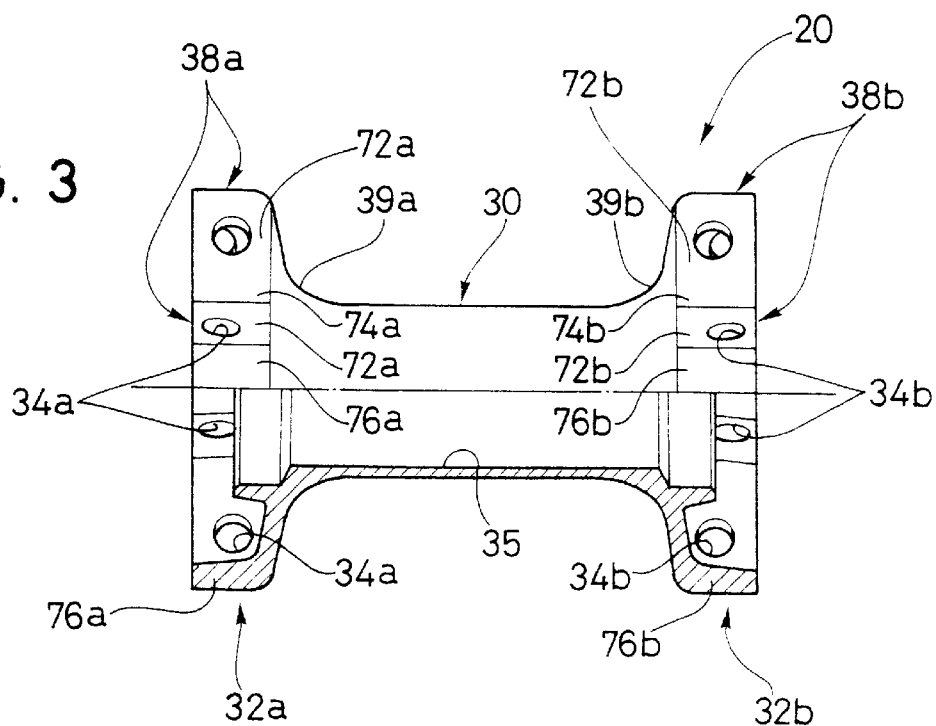
FIG. 3 is an enlarged, partial cross-sectional view of the bicycle hub illustrated in FIGS. 1 and 2.

Referring initially to FIGS. 1–3, central hub 20 has a tubular body portion 30 with a pair of tubular mounting portions 32a and 32b fixedly coupled to opposite sides of tubular body portion 30 for mounting spokes 22 thereto. Preferably, tubular body portion 30 and tubular mounting portions 32a and 32b are fixedly coupled together to form a one-piece, unitary member. It will be apparent to those skilled in the art that central hub 20 can be constructed of any substantially rigid material, such as those materials, which are known in the art. For example, hub 20 can be constructed of any suitable metallic material, such as plated steel, stainless steel, aluminum, magnesium or titanium, as well as other non-metallic materials, such as carbon fiber composite, ceramic or plastic. Moreover, tubular body portion 30, left tubular mounting portions 32a and 32b could be constructed of different materials as need and/or desired.

Tubular body portion 30 has an axial bore 35 with a hub axle assembly 36 therein. Hub axle assembly 36 is a conventional hub axle assembly, and thus, will not be described or illustrated in detail herein.

Basically, left tubular mounting portion 32a is formed of a plurality of spoke attachment projections 38a and a tapered portion 39a. As seen in FIG. 3, the right tubular mounting portion 32b is preferably identical to left tubular mounting portion 32a, but is arranged on an opposite side of tubular body portion 30. Right tubular mounting portion 32b is also formed of a plurality of spoke attachment projections 38b and a tapered portion 39b. Of course, it will be apparent to those skilled in the art from this disclosure that left tubular mounting portion 32a could be different from right tubular mounting portion 32b if needed and/or desired.

Tapered portions 39a and 39b are annular plate members that extend outwardly from tubular body portion 30. Tapered portion 39a and 39b are shaped to correspond to the shape of the tubular mounting portions 32a and 32b, respectively. Tapered portion 39a and 39b fixedly couple tubular mounting potion 32a and 32b to tubular body portion 30. Preferably, each spoke attachment projection 38a has four spoke attachment projections 38a with a pair of spoke attachment openings 34a formed in each spoke attachment projection 38a for attaching eight spokes 22 thereto. Likewise, each spoke attachment projection 38b has four spoke attachment projections 38b with a pair of spoke attachment openings 34b formed in each spoke attachment projection 38b for attaching eight spokes 22 thereto.

Of course, tubular mounting portions 32a and 32b can have more or fewer than four spoke attachment projections 38a and 38b as needed and/or desired. The number and shape of the spoke attachment projections 38a and 38b will depend upon the number of spokes, the type of spokes and the type of wheel. Additionally, each spoke attachment projection 38a and 38b can have more or fewer spoke attachment openings 34a and 34b as needed and/or desired. Spoke attachment projections 38a and 38b will be discussed in more detail below.

Figure 4:
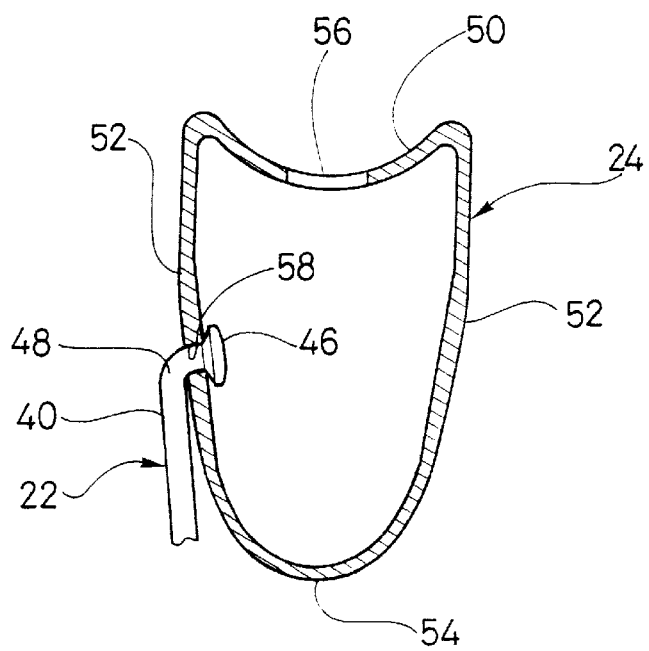
FIG. 4 is an enlarged, partial cross-sectional view of the bicycle rim as seen along section line 4—4 of FIG. 1 with the outer end of one of the spokes coupled thereto.
Figure 5:
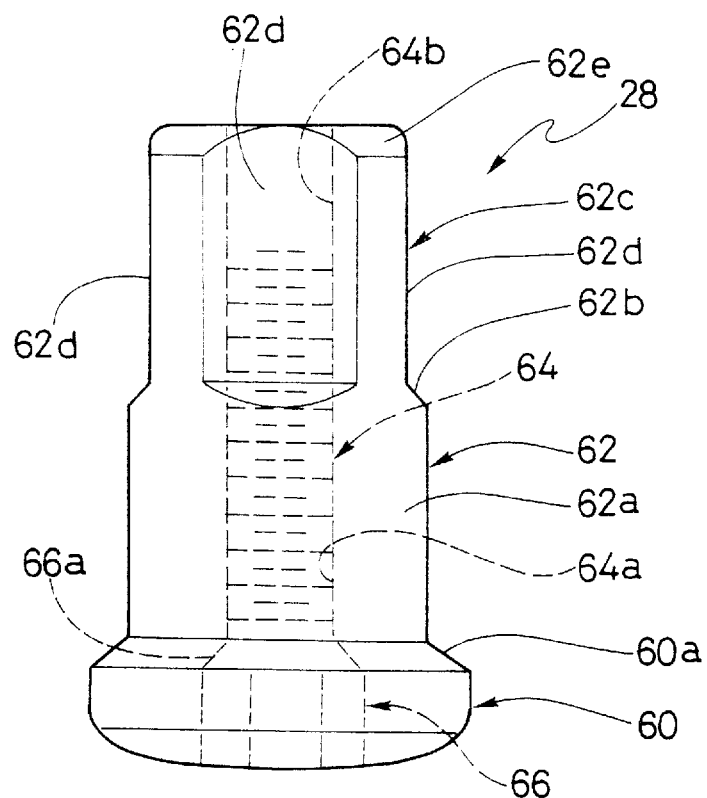
FIG. 5 is an enlarged, front elevational view one of the spoke nipples illustrated in FIGS. 1 and 2.
Figure 6:
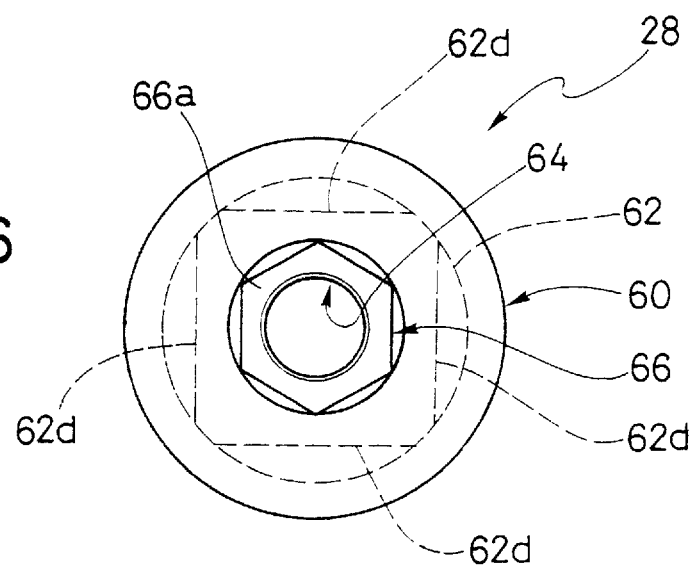
FIG. 6 is a bottom plan view of the spoke nipple illustrated in FIG. 5.

As seen in FIGS. 1, 2 and 4, each of the spokes 22 has an outer end portion 40, a center or middle portion 42 and an inner end portion 44. Outer end portions 40 have enlarged spoke heads 46 that are coupled to rim 24.

Each outer end portion 40 of spokes 22 has a bent section 48 with an enlarged head 46 at the free end of bent section 48. Bent section 48 has a circular cross-section of a predetermined width or diameter. Head 46 has a larger width or diameter than bent section 48 to secure spoke 22 to rim 24.

Straight center portions 42 are located radially inwardly of outer end portions 40. Inner end portions 44 are located radially inwardly of the center portions 42. Inner end portions 44 are threaded to couple the spokes 22 to hub 20 via spoke nipples 28. Preferably, spokes 22 are constructed as unitary, one-piece members. Preferably, center portions 42 and inner end portions 44 each have a circular cross section.

Of course, it will be apparent to those skilled in the art that the entire length of spokes 22 can have substantially uniform cross sections or varying cross sections if needed and/or desired. Additionally, it will be apparent to those skilled in the art from this disclosure that outer end portions 40 can be bent or formed to have a different shape and/or cross section than the illustrated shapes and cross sections. The shapes and cross sections of bent section 48 and head 46 of each spoke should be configured to prevent axial movement of the spoke relative to rim 24 when the spoke 22 is in the installed position.

Referring again to FIGS. 1–3, inner end portions 44 of spokes 22 are inserted through one (external) end of spoke attachment openings 34a and 34b of hub 20, and then spoke nipples 28 are inserted through the other (internal) end of spoke attachment openings 34a and 34b. Spoke nipples 28 are threadedly coupled to inner end portions 44 of spokes 22. The spoke nipples 28 engage an internal abutment surface to fixedly secure inner end portions 44 of spokes 22 to hub 20. Accordingly, spokes 22 can be tightened between hub 20 and rim 24 to secure inner end portions 44 of spokes 22 thereto.

Referring now to FIGS. 5–8, each spoke nipple 28 is formed of a head portion 60 having a first predetermined width, and a shaft portion 62 extending perpendicularly from head portion 60. Shaft portion 62 has a second maximum predetermined width that is smaller than the first predetermined width of the head portion 60. Shaft portion 62 has an axial bore 64 formed therein, and head portion 60 has a hexagonal bore 66 formed in an end surface of head portion 60. Preferably, spoke nipples 28 are formed of rigid metallic material such as cast aluminum, or the like. Additionally, each spoke nipple 28 is preferably formed as a one-piece, unitary member.

It will be apparent to those skilled in the art from this disclosure that spoke nipples 28 can be constructed of any substantially rigid material, such as those materials, which are known in the art. For example, spoke nipples 28 could be constructed of any suitable metallic material, such as plated steel, stainless steel, aluminum, magnesium or titanium, as well as other non-metallic materials, such as carbon fiber composite, ceramic or plastic. Additionally, spoke nipples 28 could be formed by machining or any other conventional method.

Preferably, each hexagonal bore 66 has the shape of a regular hexagon. In other words, hexagonal bore 66 has six sides having equal lengths and six 120° angles formed between adjacent sides of hexagonal bore 66. Therefore, hexagonal bore 66 is formed by three pairs of parallel flat surfaces. Hexagonal bore 66 of head portion 60 makes it possible to non-rotatably engage each spoke nipple 28 with a conventional hexagonal wrench or ball-hexagonal wrench, which are well known in the art.

Preferably, a ball-hexagonal wrench is utilized because it can be inserted in hexagonal bores 66 at an angle to spoke nipples 28. A ball-hexagonal wrench includes a hexagonal shaft and a generally spherical portion extending from the shaft. The generally spherical portion has an infinite number of like hexagonal cross-sections so the generally spherical portion can engage matching hexagonal bores 66 regardless of the insertion angle of the ball-hexagonal wrench.

Preferably, each axial bore 64 has a threaded section 64a for threadedly engaging inner end portion 44 of a spoke 22. Additionally, each axial bore 64 preferably has an unthreaded section 64b which acts as a guide section for receiving and guiding inner end portion 44 of a spoke 22 toward threaded section 64a.

Each spoke nipple 28 is designed to be received in one of the spoke attachment openings 34a and 34b. Specifically, the shaft portion 62 has a cylindrical section 62a with a second maximum predetermined width that is sized to be received in one of the spoke attachment openings 34a and 34b. In other words, each shaft portion 62 is axially movable and radially secured within one of the spoke attachment openings 34a and 34b. The first predetermined width of each head portion 60 is sized to engage an internal abutment surface of one of the tubular mounting portions 32a and 32b. Therefore, each spoke nipple 28 couples the inner end portion 44 of one of the spokes 22 to the hub 20.

Each head portion 60 is preferably an annular member having a convexly curved end surface. Additionally, head portion 60 has an external tapered section 60a extending to shaft portion 62. Shaft portion 62 is preferably an elongated annular member having a cylindrical section 62a, an external tapered section 62b extending from cylindrical section 62a, and a free end section 62c. Free end section 62c has two pairs of external parallel flat surfaces 62d that are arranged in a square configuration. Parallel flat surfaces 62d are provided so that free end section 62c can be non-rotationally engaged with a tool, such as a conventional spoke wrench.

Each hexagonal bore 66 has a first internal width as measured between one pair of parallel flat surfaces that is larger than a second internal width of axial bore 64. Additionally, each hexagonal bore 66 has an internal tapered section 66a extending to the axial bore 64. The internal tapered section 66a acts as an abutment surface or axial stop. Therefore, internal tapered section 66a restricts axial movement of a conventional hexagonal wrench or ball-hexagonal wrench positioned in hexagonal bore 66.

Each hexagonal bore 66 has a depth greater than one millimeter measured from the end surface of the head portion 60 to the internal tapered section 66a of hexagonal bore 66. Preferably, each hexagonal bore 66 has a depth of about 1.5 millimeters. This depth of at least one millimeter is provided so that an angled ball-hexagonal wrench inserted into the hexagonal bore 66 can maintain a non-rotational engagement with the hexagonal bore 66. Therefore, each spoke nipple 28 can be rotated even when limited axial space is provided on the head portion side of the spoke nipple 28.

A third width measured between a pair of the parallel flat surfaces 62d of free end section 62c is smaller than the second maximum predetermined width of the cylindrical section 62a of the shaft portion 62. Additionally, free end section 62c has a third external tapered section 62e formed at the free end of the shaft portion 62. Therefore, the third external tapered section 62e and the free end section 62c act as a guide portion for inserting the spoke nipples 28 into the spoke attachment openings 34a and 34b.

Referring now to FIGS. 1 and 4, rim 24 is a so-called deep rim in which the rim's radial height is greater than the rim's axial width. Rim 24 is a tubular member with a hollow, annular inner area. Rim 24 is designed to have pneumatic tire 26 fastened thereto by a rim cement. It will be apparent to those skilled in the art that the shape of rim 24 could be modified to accommodate different types of tires such as "clinchers" as needed and/or desired. Rim 24 is constructed of a substantially rigid material, such as those materials, which are well known in the art. For example, rims 24 can be constructed of any suitable metallic material, such as plated steel, stainless steel, aluminum, magnesium or titanium, as well as other non-metallic materials, such as a carbon fiber composite.

Rim 24 is substantially circular as seen in FIG. 1, and has an outer annular portion 50, a pair of annular spoke attachment portions 52 and an inner annular portion 54. The outer annular portion 50 is adapted to receive pneumatic tire 26 thereon and has a plurality of access apertures 56. Access apertures 56 are sized to insert spokes 22 therethrough.

The annular spoke attachment portions 52 are substantially parallel and are located radially inwardly of outer annular portion 50. Inner annular portion 54 connects annular spoke attachment portions 52 together. A plurality of circumferentially spaced spoke retaining openings 58 is formed in annular spoke attachment portions 52 as best seen in FIG. 4. Each spoke retaining opening 58 is arranged adjacent one of the access apertures 56 so spokes 22 can be easily installed into spoke retaining openings 58 from access apertures 56.

Referring again to FIGS. 2 and 3, the spoke attachment projections 38a and 38b will now be discussed in more detail. Each spoke attachment projection 38a has a pair of relatively flat attachment sections 72a. The inner radial ends of adjacent spoke attachment projections 38a are connected together by an inner connecting section 74a, while the outer radial ends of adjacent spoke attachment projections 38a are connected together by an outer connecting section 76a. Each attachment section 72a extends radially outwardly and has one spoke attachment opening 34a formed therein. Spoke attachment openings 34a are preferably formed as circular through holes.

Similarly, each spoke attachment projection 38b has a pair of relatively flat attachment sections 72b. The inner radial ends of adjacent spoke attachment projections 38b are connected together by an inner connecting section 74b, while the outer radial ends of adjacent spoke attachment projections 38b are connected together by an outer connecting section 76b. Each attachment section 72b extends radially outwardly and has one spoke attachment opening 34b formed therein. Spoke attachment openings 34b are preferably formed as circular through holes.

Spoke attachment openings 34a and 34b are arranged in tubular mounting portions 32a and 32b to form a space D of less than about 20 millimeters extending axially from each of the spoke attachment openings 34a or 34b to an adjacent portion of the hub 20. Preferably space D is about 16 millimeters. More specifically, pairs of spoke attachment openings 34a or 34b extend in opposing directions and are axially spaced less than about 20 millimeters from each other (i.e., from center points of spoke attachment openings 34a and 34b to opposing center points of adjacent spoke attachment openings 34a and 34b formed in adjacent attachment sections 72a and 72b). The center points of spoke attachment openings 34a and 34b are located on center axes A of spoke attachment openings 34a and 34b as best seen in FIG. 2. Of course, axial space D between adjacent spoke attachment openings 34a or 34b can be larger in a hub utilizing less than four spoke attachment projections 38a or 38b, and smaller in a hub utilizing more than four spoke attachment projections 38a or 38b.

In assembling bicycle wheel 12, the spokes 22 are installed into rim 24. The spokes 22 are inserted through the access apertures 56 in the outer annular portion 50 of rim 24 at an angle such that the inner end portions 44 of spokes 22 pass through spoke retaining openings 58. Obviously, access apertures 56 of rim 24 must be sufficiently large in width to allow an entire spoke 22, including bent section 48 and enlarged head 46 to pass therethrough. Once the spokes 22 have fully entered the interior of rim 24, the heads 46 of the spokes 22 are seated in the spoke retaining openings 58 of rim 24.

Now, the inner end portions 44 of spokes 22 are inserted into spoke attachment openings 34a and 34b of hub 20. Spoke nipples 28 are also inserted into spoke attachment openings 34 from the opposite side of spoke attachment openings 34a and 34b. Spoke nipples 28 are then threaded onto the inner end portions 44 of spokes 22. The spoke nipples 28 are rotated using a ball-hexagonal wrench. The presence of hexagonal bores 66 makes use of the ball-hexagonal wrench possible. As discussed above, the axial space from one center point of one spoke attachment opening 34a or 34b to an adjacent center point of an adjacent spoke attachment opening 34a or 34b formed in a portion of the hub 20 is less than about 20 millimeters. Therefore, when spoke nipples 28 are inserted in spoke attachment openings 34a and 34b, a limited space of less than about 14 millimeters is provided between center points of a pair of head portions 60 of a pair of adjacent spoke nipples 28.

The limited axial space between adjacent spoke nipples 28 makes it difficult or impossible to engage the head portions 60 with a conventional flat-head screwdriver. It is also difficult or impossible to use a conventional spoke wrench to rotate the free end sections 62c of spoke nipples 28 because it is very difficult to axial support spoke nipples 28 from a head portion side due to the limited axial space. Moreover, axial space on the shaft portion sides of spoke nipples 28 may be restricted due to the presence of other spokes 22. Such limited axial space on the shaft portion side of spoke nipples 28 can make it difficult or impossible to axially support spoke nipples 28 from a shaft portion side.

Therefore, spoke nipples 28 are preferably inserted and rotated in spoke attachment openings 34a and 34b using a ball-hexagonal wrench. In this manner, the ball-hexagonal wrench can provide axial support for spoke nipples 28 from a head portion side of spoke nipples 28 despite the limited axial space. Moreover, because the ball-hexagonal wrench can engage hexagonal bores 66 even when the ball-hexagonal wrench is angled relative to the spoke nipples 28, spoke nipples 28 can be conveniently threaded onto inner end portions 44 of spokes 22.

A ball-hexagonal wrench is common bicycle tool often used for other parts of the bicycle, and thus, a special tool is not required to assemble the wheel 12 with limited axial space between adjacent spoke nipples 28. Therefore, time and additional tools can be reduced during assembly of wheel 12.

The tension in spokes 22 is then adjusted such that rim 24 is properly positioned about hub 20. Once the spoke nipples 28 are at least partially threaded onto inner end portions 44 of spokes 22 with the ball-hexagonal wrench, a conventional spoke wrench can be used to adjust the tension of the spokes 22, and thus, the position of the rim 24. The wheel 12 can now be installed on a frame of a bicycle in a conventional manner via hub 20.

Of course, spoke nipples 28 could also be used in conventional wheels where axial space is not limited. Therefore, a wheel producer or bicycle mechanic would not need to maintain inventories of different spoke nipples for different wheel designs. Spoke nipples 28 are versatile and can be used in virtually all wheel designs in which spoke nipples are needed. This versatility of spoke nipples 28 eliminates the need for special spoke tools and reduces costs.

Second Embodiment

Figure 9:
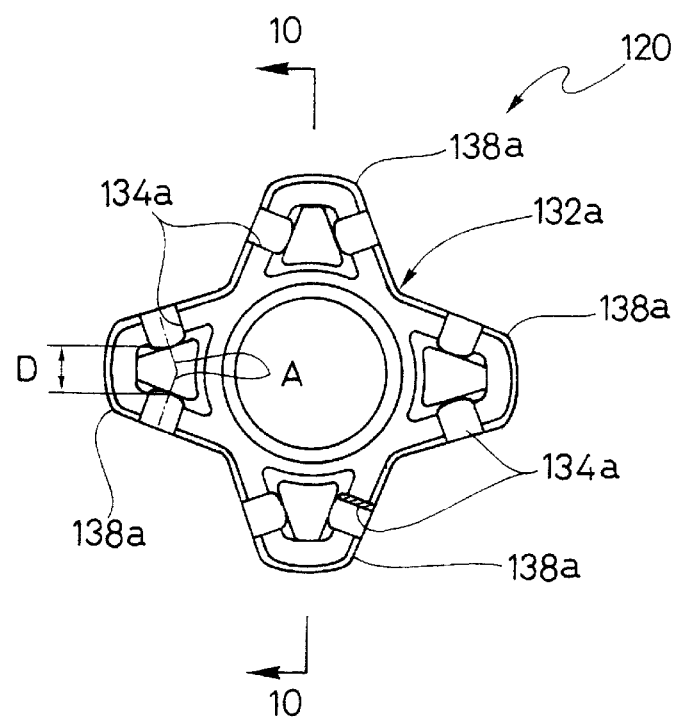
FIG. 9 is an enlarged left side elevational view of a hub for constructing a bicycle wheel in accordance with a second embodiment of the present invention.
Figure 10:
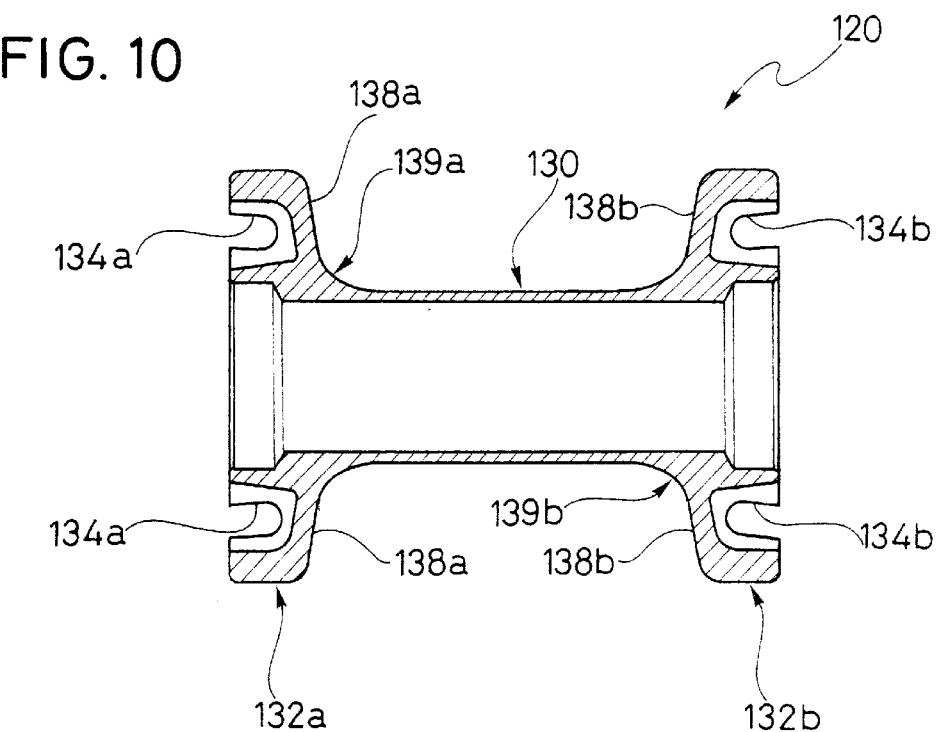
FIG. 10 is a cross-sectional view of the hub illustrated in FIG. 9 as seen along section line 10—10.

Referring now to FIGS. 9 and 10, a central hub 120 in accordance with a second embodiment of the present invention is illustrated. Central hub 120 is substantially identical to central hub 20 of the first embodiment except for portions now described. Therefore, central hub 120 will not be discussed or illustrated in detail herein. Central hub 120 is designed to use spoke nipples 28 for attaching spokes 22 and rim 24 thereto.

Basically, central hub 120 has a tubular body portion 130, a left tubular mounting portion 132a and a right tubular mounting portion 132b. Left tubular mounting portion 132a is formed of a plurality of spoke attachment projections 138a and a tapered portion 139a. Tapered portion 139a fixedly couples left tubular mounting potion 132a to tubular body portion 130. Spoke attachment projections 138a are provided with a plurality of spoke attachment openings 134a formed therein. Spoke attachment openings 134a are different from spoke attachment openings 34a of the first embodiment. Specifically, spoke attachment openings 134a are formed as longitudinal slots to allow spoke nipples 28 to slide transversely into spoke attachment openings 134a.

Right tubular mounting portion 132b is substantially the same as first tubular mounting portion 132a and is formed of a plurality of spoke attachment projections 138b and a tapered portion 139b. Tapered portion 139b fixedly couples right tubular mounting potion 132b to tubular body portion 130. Spoke attachment projections 138b are provided with a plurality of spoke attachment openings 134b formed therein. Spoke attachment openings 134b are different from spoke attachment openings 34b of the first embodiment. Specifically, spoke attachment openings 134b are formed as longitudinal slots to allow spoke nipples to slide transversely into spoke attachment openings 134b.

Similar to the first embodiment, the axial space D from a center point of one spoke attachment opening 134a or 134b to an adjacent center point of an adjacent spoke attachment opening 34a or 34b formed in a portion of the hub 120 is less than about 20 millimeters. Preferably space D is about 16 millimeters. Therefore, when spoke nipples are inserted in spoke attachment openings 134a and 134b, a limited space of less than about 14 millimeters is provided between center points of a pair of head portions of adjacent spoke nipples arranged in one attachment projection 138a or 138b.

Longitudinal slot shaped spoke attachment openings 134a and 134b make it possible to slide spoke nipples therein from opposite sides of hub 120. This type of insertion can be easier than the first embodiment because of the limited axial space D.

Third Embodiment

Figure 11:
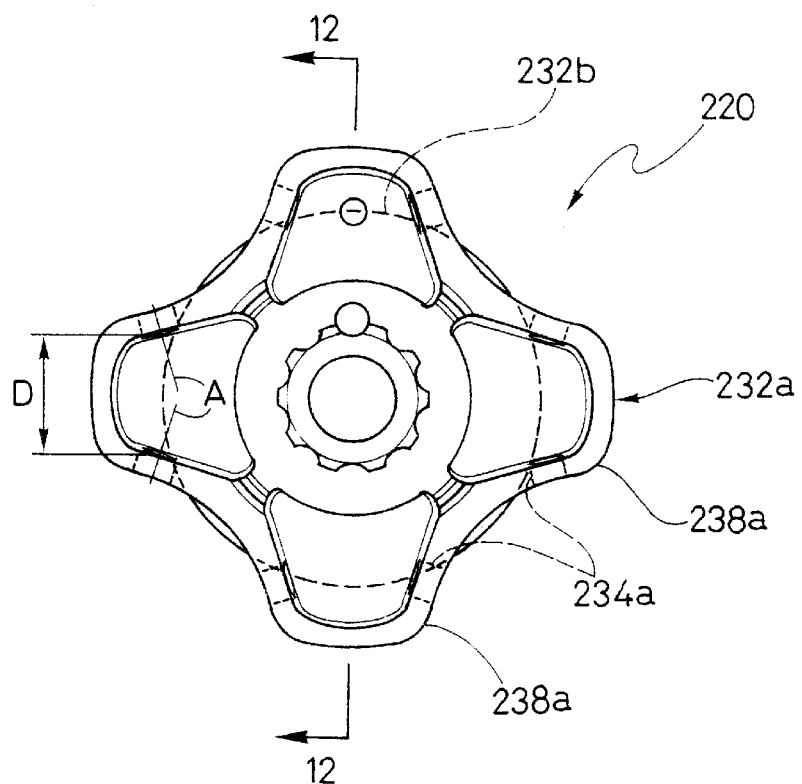
FIG. 11 is an enlarged left side elevational view of a hub for constructing a bicycle wheel in accordance with a third embodiment of the present invention.
Figure 12:
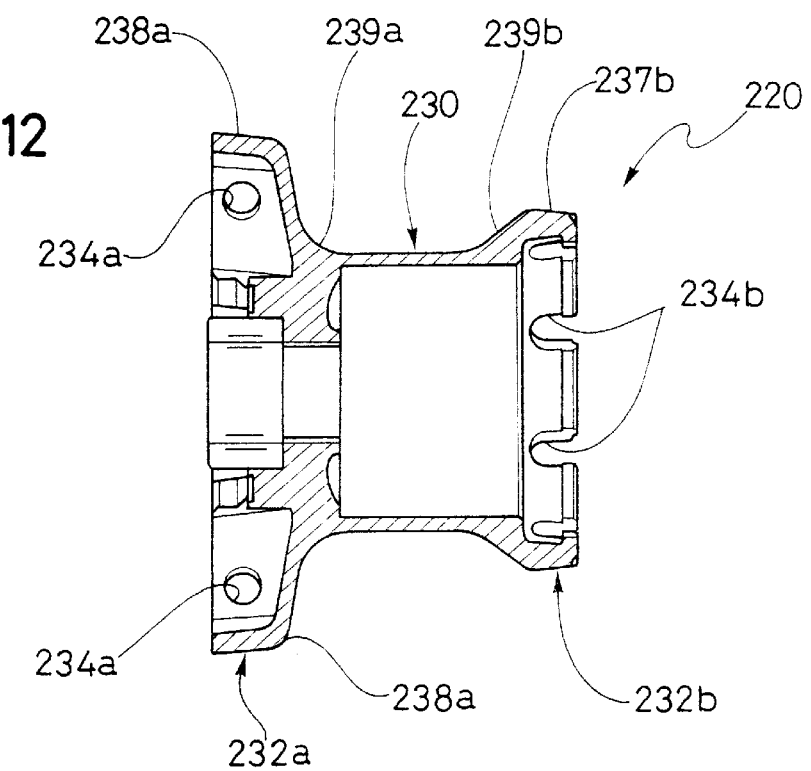
FIG. 12 is a cross-sectional view of the hub illustrated in FIG. 11 as seen along section line 12—12.

Referring now to FIGS. 11 and 12, a central hub 220 in accordance with a third embodiment of the present invention is illustrated. Central hub 220 is substantially identical to central hub 20 of the first embodiment except for portions now described. Therefore, central hub 220 will not be discussed or illustrated in detail herein. Central hub 220 is designed to use spoke nipples 28 for attaching spokes 22 and rim 24 thereto.

Basically, central hub 220 has a tubular body portion 230, a left tubular mounting portion 232a and a right tubular mounting portion 232b. Left tubular mounting portion 232a is formed of a plurality of spoke attachment projections 238a and a tapered portion 239a. Left tubular mounting portion 232a is substantially identical to left tubular mounting portion 32a of the first embodiment. Tapered portion 239a fixedly couples left tubular mounting portion 232a to tubular body portion 230. Spoke attachment projections 238a are provided with a plurality of spoke attachment openings 234a formed therein. Spoke attachment openings 234a are substantially identical to spoke attachment openings 34a of the first embodiment.

Right tubular portion 232b is different from right tubular mounting portion 32b of the first embodiment. Specifically, right tubular mounting portions 232b has a cylindrical portion 237b and a tapered portion 239b. Tapered portion 239b fixedly couples cylindrical portion 237b to tubular body portion 230. Cylindrical portion 237b is provided with a plurality of spoke attachment openings 234b formed therein. Spoke attachment openings 234b are different from spoke attachment openings 34b of the first embodiment and spoke attachment openings 234a of left tubular mounting portion 232a. Specifically, spoke attachment openings 234b are formed as longitudinal slots to allow spoke nipples to slide transversely into spoke attachment openings 234b formed in cylindrical portion 237b. Spoke attachment openings 234b are similar to spoke attachment openings 134a and 134b of the second embodiment.

Additionally, right tubular mounting portion 232b has a smaller maximum diameter than left tubular mounting portion 232a. However, spoke attachment openings 234b formed in cylindrical portion 237b are configured to use spoke nipples 28 for attaching spokes 22 and rim 24 thereto.

Similar to the first embodiment, the axial space D from a center point of one spoke attachment opening 234a to an adjacent center point of an adjacent spoke attachment opening 234a formed in a portion of hub 220 is less than about 20 millimeters. Preferably, space D is about 16 millimeters. Therefore, when spoke nipples are inserted in spoke attachment openings 234a, a limited space of less than about 14 millimeters is provided between center points of a pair of head portions of adjacent spoke nipples arranged in one attachment projection 238a.

Longitudinal slot shaped spoke attachment openings 234b make it possible to slide spoke nipples therein from a side of hub 220. This type of insertion can be easier than the first embodiment because of limited space within cylindrical portion 237b.

While only selected embodiments have been chosen to illustrate the present invention, it will be readily apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spoked hub assembly comprising:

a hub having a body portion and a first tubular mounting portion coupled to a first end of said body portion, said first tubular mounting portion being formed by four spoke attachment projections coupled together in a circumferentially spaced arrangement, each of said spoke attachment projections being formed of a pair of circumferentially spaced attachment sections connected to each other by an outer connecting section to form a spoke nipple receiving recess therebetween, each pair of said spoke attachment sections of each of said spoke attachment projections being angled to converge at a point radially outwardly of said connecting section to form an acute angle therebetween, each of said spoke attachment sections having a spoke attachment opening formed therein, each pair of said spoke attachment openings of each of said spoke attachment projections being arranged to form a limited axial space less than about twenty millimeters between each pair of said spoke attachment openings of each of said spoke attachment projections;

a plurality of spoke nipples arranged in said spoke attachment openings, each spoke nipple including a head portion arranged on said first side of one of said spoke attachment openings and a shaft portion extending axially from said head portion through one of said spoke attachment openings, said head portion having an end surface with a hexagonal bore formed therein and a first predetermined width, said shaft portion having an axial bore with internal threads and a second maximum predetermined width that is smaller than said first predetermined width of said head portion, each of said hexagonal bores having a depth configured to be angularly engageable with a ball-hexagon wrench to rotate said spoke nipples within said spoke attachment openings during assembly; and a plurality of outwardly extending spokes with each of said spokes having an inner threaded end portion, an outer end portion, and a center portion located between said inner and outer end portions, each of said inner threaded end portions being coupled to one of said spoke nipples such that each pair of said spokes coupled to each of said spoke attachment projections diverge from each other to form an obtuse angle therebetween, each of said outer end portions of said spokes having an enlarged head member adapted to be retained by a rim.

2. The spoked hub assembly according to claim 1, wherein
each of said axial bores has an unthreaded section.

3. The spoked hub assembly according to claim 1, wherein
each of said axial bores has a smaller width than a width between a pair of parallel flat surfaces formed by said hexagonal bores.

4. The spoked hub assembly according to claim 1, wherein
each of said shaft portions has a free end section with third predetermined width, said third predetermined widths being smaller than said second maximum predetermined widths of said shaft portions.

5. The spoked hub assembly according to claim 4, wherein
each of said free end sections has at least a first pair of parallel flat surfaces.

6. The spoked hub assembly according to claim 5, wherein
each of said free end sections has a second pair of parallel flat surfaces that are perpendicular to said first pair of said parallel flat surfaces.

7. The spoked hub assembly according to claim 1, wherein
each of said hexagonal bores has an axial depth greater than one millimeter.

8. The spoked hub assembly according to claim 1, wherein
said hub includes a second tubular mounting portion coupled to a second end of said body portion of said hub.

9. A spoked hub assembly comprising:
a hub having a body portion and a first tubular mounting portion coupled to a first end of said body portion, said fist tubular mounting portion being formed by four spoke attachment projections coupled together in a circumferentially spaced arrangement, each of said spoke attachment projections being formed of a pair of circumferentially spaced attachment sections connected to each other by an outer connecting section to form a spoke nipple receiving recess therebetween, each of said pairs of said spoke attachment sections of each of said spoke attachment projections being angled to converge at a point radially outwardly of said connecting section to form an acute angle therebetween, each of said spoke attachment sections having a spoke attachment opening extending therethrough;

a plurality of spoke nipples arranged in said spoke attachment openings, each spoke nipple including a head portion and a shaft portion extending from said head portion, said head portion having an end surface with a hexagonal bore formed therein and a first predetermined width, said shaft portion having an axial bore with internal threads and a second maximum predetermined width that is smaller than said first predetermined width of said head portion; and a plurality of outwardly extending spokes with each of said spokes having an inner threaded end portion, an outer end portion, and a center portion located between said inner and outer end portions, each of said inner threaded end portions being coupled to one of said spoke nipples such that each pair of said spokes coupled to each of said spoke attachment projections diverge from each other to form an obtuse angle therebetween, each of said outer end portions of said spokes having an enlarged head member adapted to be retained by a rim, each pair of said spoke nipples that are arranged in said spoke attachment openings of one of said spoke attachment projections of said hub being arranged such that said head portions of each of said pain of said spoke nipples are spaced less than about fourteen millimeters as measured between center points of said head portions, each of said hexagonal bores having a depth configured to be angularly engageable with a ball-hexagon wrench to rotate said spoke nipples within said spoke attachment openings during assembly.

10. The spoked hub assembly according to claim 9, wherein
said hub includes a second tubular mounting portion coupled to a second end of said body portion of said hub.

11. The spoked hub assembly according to claim 9, wherein
each of said axial bores has an unthreaded section.

12. The spoked hub assembly according to claim 9, wherein
each of said axial bores has a smaller width than a width between a pair of parallel flat surfaces formed by said hexagonal bores.

13. The spoked hub assembly according to claim 9, wherein
each of said shaft portions has a free end section with third predetermined width, said third predetermined widths being smaller than said second maximum predetermined widths of said shaft portions.

14. The spoked hub assembly according to claim 13, wherein
each of said free end sections has at least a first pair of parallel flat surfaces.

15. The spoked hub assembly according to claim 14, wherein
each of said free end sections has a second pair of parallel flat surfaces that are perpendicular to said first pair of said parallel flat surfaces.

16. The spoked hub assembly according to claim 9, wherein
each of said hexagonal bores has an axial depth greater than one millimeter.

17. A wheel comprising:

a hub having a body portion and a first tubular mounting portion coupled to a first end of said body portion, said first tubular mounting portion being formed by four spoke attachment projections coupled together in a circumferentially spaced arrangement, each of said spoke attachment projections being formed of a pair of circumferentially spaced attachment sections connected to each other by an outer connecting section to form a spoke nipple receiving recess therebetween, each pair of said spoke attachment sections of each of said spoke attachment projections being angled to converge at a point radially outwardly of said connecting section to form an acute angle therebetween, each of said spoke attachment sections having a spoke attachment opening formed therein, each pair of said spoke attachment openings of each of said spoke attachment projections being arranged to form a limited axial space less than about twenty millimeters between each pair of said spoke attachment openings of each of said spoke attachment projections;

a plurality of spoke nipples arranged in said spoke attachment openings, each spoke nipple including a head portion arranged on said first side of one of said spoke attachment openings and a shaft portion extending axially from said head portion through one of said spoke attachment openings, said head portion having an end surface with a hexagonal bore formed therein and a first predetermined width, said shaft portion having an axial bore with internal threads and a second maximum predetermined width that is smaller than said first predetermined width of said head portion, each of said hexagonal bores having a depth configured to be angularly engageable with a ball-hexagon wrench to rotate said spoke nipples within said spoke attachment openings during assembly;

a plurality of outwardly extending spokes with each of said spokes having an inner threaded end portion, an outer end portion, and a center portion located between said inner and outer end portions, each of said inner threaded end portions being coupled to one of said spoke nipples such that each pair of said spokes coupled to each of said spoke attachment projections diverge from each other to form an obtuse angle therebetween, each of said outer end portions of said spokes having an enlarged head member adapted to be retained by a rim; and a rim coupled to said outer end portions of said spokes, said rim having an outer annular portion adapted to receive a tire thereon and a plurality of holes with said outer end portions of said spokes received therein to retain said enlarged heads of said spokes.

18. The spoked hub assembly according to claim 17, wherein said hub includes a second tubular mounting portion coupled to a second end of said body portion of said hub.

19. A wheel comprising:

a hub having a body portion and a fist tabular mounting portion coupled to a first end of said body portion, said first tubular mounting portion being formed by four spoke attachment projections coupled together in a circumferentially spaced arrangement, each of said spoke attachment projections being formed of a pair of circumferentially spaced attachment sections connected to each other by an outer connecting section to form a spoke nipple receiving recess therebetween, each of said pairs of said spoke attachment sections of each of said spoke attachment projections being angled to converge at a point radially outwardly of said connecting section to form an acute angle therebetween, each of said spoke attachment sections having a spoke attachment opening extending therethrough;

a plurality of spoke nipples arranged in said spoke attachment openings, each spoke nipple including a head portion and a shaft portion extending from said head portion, said head portion having an end surface with a hexagonal bore formed therein and a first predetermined width, said shaft portion having an axial bore with internal threads and a second maximum predetermined width that is smaller than said first predetermined width of said head portion;

a plurality of outwardly extending spokes with each of said spokes having an inner threaded end portion, an outer end portion, and a center portion located between said inner and outer end portions, each of said inner treaded end portions being coupled to one of said spoke nipples such that each pair of said spokes coupled to each of said spoke attachment projections diverge from each other to form an obtuse angle therebetween, each of said outer end portions of said spokes having an enlarged head member; and a rim coupled to said outer end portions of said spokes, said rim having an outer annular portion adapted to receive a tire thereon and a plurality of holes with said outer end portions of said spokes received therein to retain said enlarged heads of said spokes, each pair of said spoke nipples that are arranged in said spoke attachment openings of one of said spoke attachment projections of said hub being arranged such that said head portions of each of said pairs of said spoke nipples are spaced less than about fourteen millimeters as measured between center points of said head potions, each of said hexagonal bores having a depth configured to be angularly engageable with a ball-hexagon wrench to rotate said spoke nipples within said spoke attachment openings during assembly.

20. The spoked hub assembly according to claim 19, wherein said hub includes a second tubular mounting portion coupled to a second end of said body portion of said hub.

* * * * *